United States Patent Office 2,749,207
Patented June 5, 1956

2,749,207

PROCESS FOR DYEING OR PRINTING CELLULOSE-CONTAINING MATERIALS AND DYESTUFF PREPARATIONS THEREFOR

Karl Menzi and Jacques Wegmann, Basel, Switzerland, assignors to Ciba Limited, Basel, Switzerland, a Swiss firm No Drawing. Application November 10, 1952, Serial No. 319,773

Claims priority, application Switzerland November 16, 1951

18 Claims. (Cl. 8—42)

The present invention is based on the observation that cellulose-containing materials can be dyed or printed with great advantage by using a neutral to alkaline dyebath or printing paste which contains a dyestuff containing at least two azo-linkages and capable of forming complex metal compounds sparingly soluble in water, an amine, advantageously an aliphatic amine, which contains at least one amino group separated by two carbon atoms from an HO-group, phosphorus-containing anions of a phosphoric acid containing at least two phosphorus atoms in the acid molecule, especially a phosphoric acid of the constitution $$H_{m+2}P_mO_{3m+1}$$

in which $m$ represents a whole number greater than 1, and an alkali-resistant compound of a metal having an atomic number from 27 to 29, advantageously one in which the metal is bound to at least one of the aforesaid substances.

It will be understood from the foregoing that there may be used for preparing the dyebath either the finished complex metal compounds or mixtures capable of forming them.

In the latter case there is used, for example, a neutral to alkaline dyebath or printing paste for the preparation of which there are used an amine, advantageously an aliphatic amine, which contains at least one amino group separated by two carbon atoms from an HO-group, phosphorus-containing anions of a phosphoric acid containing at least two phosphorus atoms in the acid molecule, especially an acid of the constitution $$H_{m+2}P_mO_{3m+1}$$

in which $m$ represents a whole number greater than 1, an alkali-resistant compound of a metal having an atomic number from 27 to 29, advantageously a compound of which the metal is bound to at least one of the aforesaid substances, and a metal-free dyestuff containing at least two azo linkages and capable of forming complex metal compounds sparingly soluble in water.

When the finished metal complex is used for preparing the dyebath or printing paste there is used, for example, a neutral to alkaline dyebath for the preparation of which there is used an amine, advantageously an aliphatic amine, containing at least one amino group separated by two carbon atoms from an HO-group, a phosphorus compound of a phosphoric acid containing at least two phosphorus atoms in the acid molecule, and especially an acid of the constitution $$H_{m+2}P_mO_{3m+1}$$

in which $m$ represents a whole number greater than 1, and a sparingly soluble complex metal compound of a dyestuff containing at least two azo linkages, of which the metal in complex union is a metal having an atomic number from 27 to 29.

The dyebaths can generally be prepared either directly in the concentration necessary for dyeing or advantageously by diluting so-called stock solutions, which have the compositions given above, but contain the aforesaid ingredients in a higher concentration usually too great for dyeing.

The dyestuffs used for preparing the printing pastes or solutions may, as stated above be used in the form of their complex metal compounds of metals having an atomic number from 27 to 29, or free from metal in complex union together with an alkali-resistant agent yielding such a metal. As metals there come into consideration cobalt or especially nickel or copper, and above all the latter. As alkali-resistant agents yielding metal there are to be understood metal compounds which are not converted into their hydroxides in alkaline solutions, such as are customary in the usual direct dyeing methods, but which are capable of metallizing dyestuffs.

The dyestuffs contain at least two azo linkages and at least one group capable of forming complexes, and are sparingly soluble in water in the form of their cobalt, nickel or copper complexes, and are therefore unsuitable for dyeing by the usual direct dyeing methods.

The dyestuffs may contain as metallized or metallizable groups, for example, ortho:ortho'-dihydroxy-azo-groupings or ortho-hydroxy-ortho'-carboxy-azo-groupings, and, if desired, may contain metallized or metallizable groups different from each other. Especially valuable results are obtained with dyestuffs which contain as a metallizable or metallized group an ortho-hydroxyaryl-ortho'-carboxy-azo-grouping or an ortho:ortho'-dihydroxy-azo-grouping having at least one hydroxyl group bound to an aryl carbon atom.

The dyestuffs and their complex cobalt, nickel or copper compounds coming into consideration may be made by methods in themselves known. A large number of suitable dyestuffs of the kind defined above, especially those free from metal, is known. Among the latter dyestuffs there may be used in the manner described above practically all those which as such or in the form of their cobalt, nickel or copper complexes yield sparingly soluble metal compounds, but which can be used for dyeing cellulose fibers by the known after-metallizing processes.

For the preparation of the solutions or printing pastes to be used in the invention it is of advantage that the ionogenic acid groups present in the dyestuffs, that is to say especially sulfonic acid and carboxylic acid groups (insofar as the latter are not to take part in the formation of complexes), should be in the form of their alkali metal salts.

The amines, advantageously aliphatic amines, used in the process of the invention contain at least one amino group which is separated by two carbon atoms from an HO-group, which latter group may be present in a carboxylic acid group. The amines are therefore characterized by the presence of at least one atomic grouping of the formula

As examples there may be mentioned monoethanolamine, aminoacetic acid, β-hydroxyethylaminoacetic acid, and 2-amino-1-hydroxybenzene-4-sulfonamide.

In many cases, as will be understood from the foregoing, there may be used solid amines, for example, those melting above 50° C. There have been found advantageous, for example, the amines of the constitution

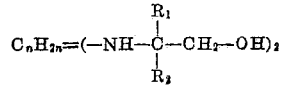

in which $R_1$ represents a hydrogen atom, an alkyl group having at most 3 carbon atoms or a hydroxymethyl group, $R_2$ represents a hydrogen atom or a methyl group, and $n$ represents a whole number not greater than 4, and advantageously 2.

As examples the amines of the following constitution may be mentioned:

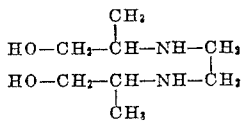

Melting point 136 to 139° C.

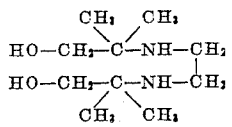

Melting point 177 to 181° C.

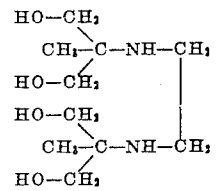

Melting point 154 to 157° C.

Especially valuable results are obtained with 1:2-di-(β-hydroxyethylamino)-ethane of the formula

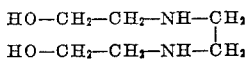

Melting point 93 to 94° C.

The phosphorus compounds present in the solutions used for dyeing or printing in accordance with the invention are derived from polyphosphoric acids. There may be used, for example, compounds derived from pyrophosphoric acid or higher polyphosphoric acids such as $H_5P_3O_{10}$ or $H_6P_4O_{13}$.

With regard to the relative proportions of the substances described above, which are present in the solutions or are used for preparing the solutions, the following remarks should be noted: When metal-free dyestuffs are used for preparing the solutions it is desirable to add the theoretical quantity of the agent yielding metal or slightly more than that quantity. It is also advisable to introduce more than 2 molecules of the aliphatic amine per group capable of forming complexes. The quantity of the phosphorus-containing anion may vary within wide limits. Thus, good results are obtained when the proportion by weight of pyrophosphate or polyphosphate ions amounts to about one-sixth of the proportion of dyestuff, but even greater quantities have no disadvantageous effect. It is of advantage in practice to use a proportion of phosphorus-containing ions amounting to about one-third to twice the weight of the dyestuff.

The solutions and printing pastes may be prepared in different ways, of which a few especially advantageous methods are described below. Generally, it is of advantage for preparing printing pastes, and also for preparing solutions to be used for dyeing, especially in the case of stock solutions, to use hot water. The following substances, for example, may be used for preparing the solutions or printing pastes:

(a) Complex metal compound of the dyestuff, aliphatic amine and alkali pyrophosphate ($Na_4P_2O_7$) or an alkali polyphosphate, (b) Complex metal compound of the dyestuff, pyrophosphate or polyphosphate of the amine and an alkali hydroxide or an excess of the amine, (c) Metal-free dyestuff, complex metal compound of the amine, and alkali pyrophosphate or an alkali polyphosphate, (d) Metal-free dyestuff, amine and alkali copper pyrophosphate (for example $3Na_4P_2O_7+Cu_2P_2O_7$), (e) Metal-free dyestuff and the reaction product of copper pyrophosphate ($Cu_2P_2O_7$) with the amine, (f) Metal-free dyestuff, alkali pyrophosphate or an alkali polyphosphate, amine and alkali-resistant agent yielding copper, for example, a complex alkali-copper compound of an aliphatic hydroxycarboxylic acid such as lactic acid, citric acid or especially tartaric acid.

It will be understood that in the above compositions the terms "dyestuff" and "amine" refer to the products as defined in the opening part of this specification.

The order of succession in which the ingredients mentioned under (a) to (f) are added to the water is generally quite optional and has no influence on the result. On the other hand, good results are usually impaired if, in preparing the solutions, other electrolytes are added in appreciable amounts to the ingredients specified, so that it is of advantage to avoid such further additions. For this reason it is desirable not to add the dyestuff, whether it be the metal-free or metalliferous product, in a form made up to a certain strength with sodium sulfate or sodium chloride, but to add it in the form in which it is usually separated out in the course of manufacture, and in which such salts are not present in quantities which would have a disadvantageous effect. This disadvantageous effect consists mainly in a disturbance of the process of dissolution, which at high dilutions, for example, at the concentration customary in dyebaths scarcely arises, but at high concentrations such, for example, as in stock solutions, printing pastes or the concentrations sometimes necessary in machine dyeing, may lead to the dyestuff being incompletely dissolved.

The dyebaths used in the process of the invention are neutral or advantageously alkaline solutions. Insofar as the alkaline reaction is not produced directly, for example, by the addition of a polyphosphate or the presence of a sufficient proportion of amine, the alkaline reaction can be produced by adding suitable substances of alkaline reaction such as an alkali hydroxide, ammonia or further amine. For the reasons given above, however, it is generally not recommended to use alkali carbonates or bicarbonates for this purpose.

Instead of preparing the dyebaths, stock solutions or printing pastes by taking up the substances mentioned under (a) to (f) individually and successively in water, it is generally of advantage, where possible, to dry the ingredients or to work them up into preparations of paste form. Thus, for example, the substances given under (a) to (f) may be mixed together in the dry state or aqueous mixtures or solutions thereof may be prepared and, if desired, the latter may be evaporated to dryness.

As some of the amines used in the process of the invention are liquid and some of the solid amines have a strong hygroscopic action in the preparations, it may be of advantage in order to produce uniform results when such amines are used not to mix the amine with the solid preparation, but only to add the amine when the solutions or printing pastes are to be prepared. For making up preparations of this kind there are numerous possibilities which will be easily understood from those of the foregoing definitions of the dyebaths according to which a free amine is used (see also the various possibilities (a) to (f) above). Thus, for example, those preparations have been found to be of value which contain a sparingly soluble complex cobalt, copper or nickel compound of a dyestuff containing at least two azo linkages and an alkali pyrophosphate.

When the preparation, whether it contains the amine or not, is to be made up to a certain dyeing strength it is advisable for this purpose to select a larger or smaller quantity of the alkali pyrophosphate or polyphosphate as required, insofar as the preparation contains such a pyrophosphate or polyphosphate, and where the phosphate ions have been added in another form (for example, in the form of sodium copper pyrophosphate) to add also an alkali phosphate if necessary. Alkali phosphates of this kind are convenient diluents for the preparations because in contradistinction to the usual additions such as sodium sulfate, they have no disadvantageous effect and the proportion in which they are used may vary within wide limits. Instead of or in addition to the alkali phosphates, however, there may be used non-electrolytes, such as urea or water-soluble carbohydrates such as saccharose or dextrin.

Dyeing or printing with the solutions of the invention is carried out by methods in themselves known for direct dyeing dyestuffs.

In the production of printing pastes it is generally advisable to add hydrotropic agents, especially urea. As the complex metal compounds are sensitive to reducing agents, it is generally of advantage to avoid the use of thickening agents, such as British gum, having a pronounced reducing action, and to use vegetable mucilages such as tragacanth thickening. In other respects the printing can be carried out in known manner, by drying the prints, and then steaming and rinsing. Usually a relatively short steaming period of about 10–20 minutes suffices to bring about complete fixation of the prints.

In this manner there are obtained dyeings and prints distinguished by their good color strength, purity of tint and good properties of fastness.

In certain cases it may be of advantage to after-treat dyeings or prints obtained by the present process with agents which enhance their properties of wet fastness. As products that improve the wet fastness properties of dyeings there may be mentioned inter alia, the reaction products of formaldehyde with compounds such as cyanamide, dicyandiamide, dicyandiamidine, melamine, and the like. There also come into consideration after-treating agents made without formaldehyde.

The following examples illustrate the invention, the parts and percentages being by weight unless otherwise stated, and the relationship of parts by weight to parts by volume being the same as that of the kilogram to the liter:

*Example 1*

5 parts of the copper compound of the dyestuff of the formula

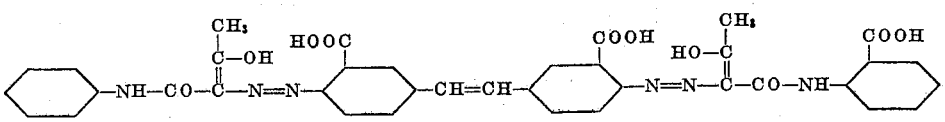

are intimately mixed in the form of a press cake having a dry content of 20 per cent. with 2 parts of sodium pyrophosphate and 2 parts of 1:2-di-(β-hydroxyethylamino)-ethane, and the mixture is dried in vacuo at 40–50° C.

A part of the resulting mixture is dissolved in 1000 parts of water, and then further diluted to 3000 parts by volume. Into the dyebath so prepared and having a temperature of 60° C. there are entered 100 parts of previously wetted cotton, and dyeing is carried on for one hour, the temperature being raised to 90–95° C. in the course of 20 minutes and after ½ hour 30 parts of crystalline sodium sulfate being added. After rinsing and drying the cotton, there is obtained a brownish orange dyeing of good fastness to washing and light.

By replacing the 1:2-di-(β-hydroxyethylamino)-ethane by the same quantity of aminoacetic acid (glycocoll) a similar result is obtained.

*Example 2*

Equal parts of crystalline sodium pyrophosphate, urea and the copper compound of the dyestuff of the formula

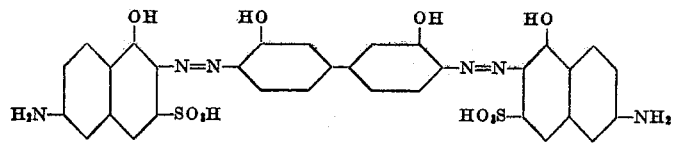

are mixed together. 1 part of the resulting dyestuff preparation is covered with 1 part of 2-amino-ethanol, and the mixture is boiled with 200 parts of water to form an aqueous stock solution.

For the purpose of dyeing, the stock solution is diluted to 2000 parts by volume, and 100 parts of well wetted cotton are entered at 50–60° C. The temperature is raised to the boil in the course of ½ hour while moving the goods. Boiling is continued for one hour, and 2 portions of 15 parts of crystalline sodium sulfate are added, one after 5 minutes and the other after 20 minutes. After rinsing and drying the goods, there is obtained a blue dyeing of excellent fastness to light and washing.

The same result is obtained by replacing the 2-aminoethanol by an aqueous solution of 1 part of one of the products of the formulae

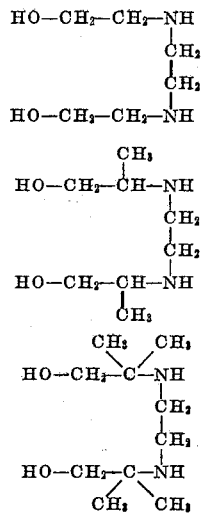

and

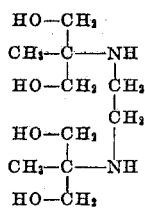

*Example 3*

183 parts of 2-aminoethanol are heated to 130° C. while stirring, and 99 parts of 1:2-dichlorethane are run in slowly while refluxing. When the addition is complete, the mixture is maintained for ½ hour at 140–150° C., and then cooled to room temperature. 80 parts of finely ground sodium hydroxide suspended in 300 parts of ethanol are then added, and the mixture is filtered after stirring for 2 hours to remove precipitated sodium chloride. The filtrate, a yellowish oil, is a mixture consisting mainly of 1:2-di-(β-hydroxyethylamino)-ethane and 2-aminoethanol.

1.5 parts of the filtrate are boiled with 1 part of a dyestuff preparation consisting of equal parts of crystalline sodium pyrophosphate, urea and the copper compound of the dyestuff of the formula

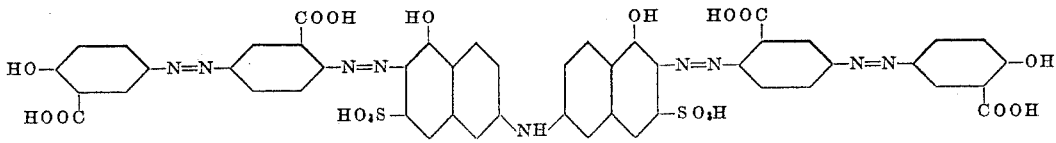

in 200 parts of water to form a clear stock solution.

For dyeing the stock solution is diluted with water to 2000 parts by volume, and 100 parts of previously wetted cotton are entered at 50–60° C. The temperature is raised to the boil in the course of ½ hour while moving the goods. Boiling is continued for one hour, during which 2 portions of 15 parts of crystalline sodium sulfate are added, one after 5 minutes and the other after 20 minutes. After rinsing and drying there is obtained a blue dyeing of good fastness to light and washing.

The sodium pyrophosphate may be replaced by sodium tripolyphosphate (Na$_5$P$_3$O$_{10}$) or hexa-sodium tetrapolyphosphate (Na$_6$P$_4$O$_{13}$) with the same success.

*Example 4*

Equal parts of the copper compound of the dyestuff of the formula

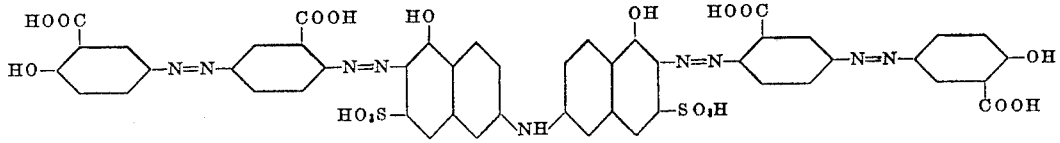

crystalline sodium pyrophosphate and aminoacetic acid are mixed together.

2 parts of the resulting dyestuff preparation are dissolved in 400 parts of water. The resulting clear stock solution is diluted to 2000 parts by volume, and 100 parts of previously wetted cotton are entered at 50–60° C. The temperature is raised to the boil in the course of ½ hour while moving the goods. Boiling is continued for one hour, during which 2 portions of 15 parts of crystalline sodium sulfate are added, one after 5 minutes and the other after 20 minutes. After rinsing and drying there is obtained a blue dyeing of good fastness to light and washing.

*Example 5*

Equal parts of the copper compound of the dyestuff of the formula urea and crystalline sodium pyrophosphate are mixed together.

In order to prepare a clear stock solution, 1 part of the above dyestuff preparation is covered with a solution of 1 part of 1:2-di-(β-hydroxyethylamino)-ethane in 3 parts of water, and boiled with 200 parts of water.

For dyeing, the resulting stock solution is diluted with water to 2000 parts by volume, and 100 parts of previously wetted cotton are entered at 50–60° C. The temperature is raised to the boil in the course of ½ hour while moving the goods. Boiling is continued for a further hour, during which two portions of 15 parts of crystalline sodium sulfate are added one after 5 minutes and the other after 20 minutes. After rinsing and drying there is obtained a blue dyeing of excellent fastness to light and washing.

The same success is obtained with a dyestuff preparation which contains, instead of the copper compound of the dyestuff of the above formula, the same quantity of the product obtained by coppering accompanied by demethylation in known manner from the product of coupling in an alkaline medium 1 mol of tetrazotized 4:4'-diamino-3:3'-dimethoxy-1:1'-diphenyl and 2 mols of 2-(β - hydroxyethylamino) - 5 - hydroxynaphthalene - 7 - sulfonic acid.

By replacing the copper compound, by the same quantity of the nickel compound of the aforesaid dyestuff there is obtained a dyeing of a somewhat more reddish tint, and also having very good fastness to light and washing.

*Example 6*

0.5 part of the copper compound of the dyestuff of the formula

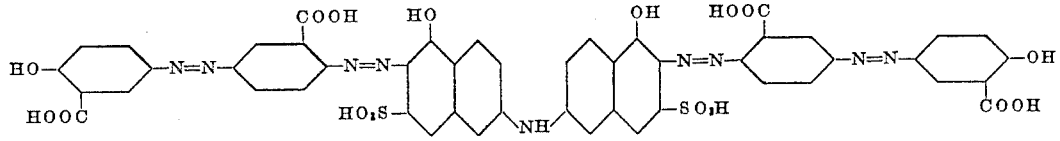

is boiled in 200 parts of water with 5 parts of sodium hydroxide solution of 10 per cent. strength and the neutral pyrophosphate of 1:2-di-(β-hydroxyethylamino)-ethane of the formula

[HO(CH$_2$)$_2$NH(CH$_2$)$_2$NH(CH$_2$)$_2$OH]$_2$P$_2$O$_7$ to form a clear stock solution.

For dyeing, the stock solution is diluted with water to 2000 parts by volume and 100 parts of previously wetted cotton are entered at 50–60° C. The temperature is

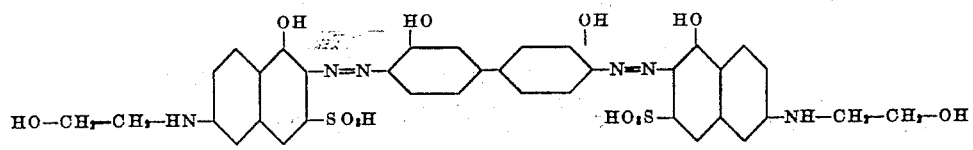

raised to the boil in the course of ½ hour while moving the goods. Boiling is continued for 1 hour, during which two portions of 15 parts of crystalline sodium sulfate are added one after 5 minutes and the other after 20 minutes. After rinsing and drying there is obtained a blue dyeing of good fastness to light and washing.

The neutral pyrophosphate of 1:2-di-(β-hydroxyethylamino)-ethane is prepared as follows:

17.8 parts of pyrophosphoric acid are dissolved in 200 parts of water. 1:2-di-(β-dihydroxyethylamino)-ethane is added until the reaction is neutral to litmus, for which purpose 29.6 parts are required. The solution is evaporated to dryness in vacuo. The new product is a yellow wax-like hygroscopic mass.

*Example 7*

Equal parts of the nickel compound of the dyestuff of the formula

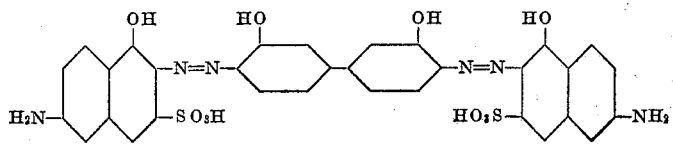

saccharose and crystalline sodium pyrophosphate are mixed together.

In order to prepare a clear stock solution 1 part of the resulting dyestuff preparation is covered with a solution of 1 part of 1:2-di-(β-hydroxyethylamino)-ethane in 3 parts of water, and boiled with 200 parts of water.

For dyeing, the stock solution is diluted with water to 2000 parts, and 100 parts of previously wetted cotton are entered at 50-60° C. The temperature is raised to the boil in the course of ½ hour while moving the goods. Boiling is continued for one hour, during which two portions of 15 parts of crystalline sodium sulfate are added one after 5 minutes and the other after 20 minutes. After rinsing and drying there is obtained a blue dyeing of excellent fastness to light and washing.

*Example 8*

1 part of the dyestuff preparation consisting of equal parts of crystalline sodium pyrophosphate, urea and the copper compound of the dyestuff of the formula

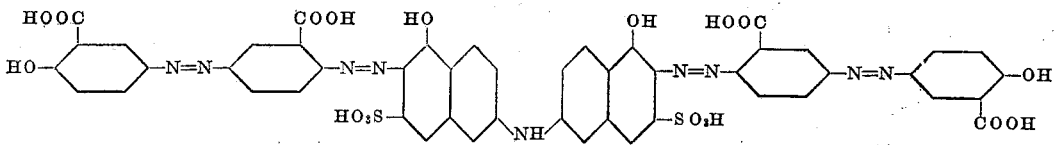

is covered with a solution of 1 part of 1:2-di-(β-hydroxyethylamino)-ethane in 3 parts of water, and the mixture is stirred. In order to obtain a clear stock solution the mixture is boiled with 400 parts of water.

For dyeing, the stock solution is diluted with water to 2000 parts by volume and 100 parts of previously wetted cotton are entered at 50-60° C. The temperature is raised to the boil in the course of ½ hour while moving the goods. Boiling is continued for one hour during which two portions of 15 parts of crystalline sodium sulfate are added one after 5 minutes and the other after 20 minutes. After rinsing and drying there is obtained a blue dyeing of good fastness to light and washing.

By replacing in the aforesaid dyestuff preparation, the copper compound by an equal quantity of the cobalt compound of the same dyestuff, there is obtained after dyeing a somewhat more greenish blue tint also of good fastness to light and washing.

*Example 9*

1 part of the dyestuff of the formula

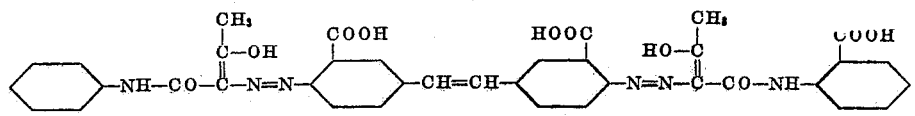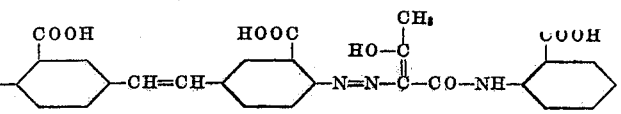

is dissolved in 6000 parts of water. 2 parts of sodium copper pyrophosphate and 2 parts of 1:2-di-(β-hydroxyethylamino)-ethane are then added.

The temperature of the resulting dyebath is brought to 60° C. and 200 parts of previously wetted cotton are entered. In the course of ½ hour the temperature is raised to 90°-95° C. After 20 minutes 60 parts of crystalline sodium sulfate are added, and then dyeing is carried on for a further ½ hour. At the end of this period the cotton is rinsed and dried, and there is obtained a brownish orange dyeing of good fastness to washing and light. By using sodium nickel pyrophosphate, instead of sodium copper pyrophosphate, there is also obtained an orange dyeing.

By using sodium copper tartrate instead of sodium copper pyrophosphate there is obtained a duller and weaker dyeing.

By using sodium copper pyrophosphate without 1:2-di-(β-hydroxyethylamino)-ethane only a weak dyeing is obtained.

By carrying out the above dyeing process in the absence of the base and copper pyrophosphate complex, and after-coopering in known manner there is obtained a dyeing that is weaker and duller, and corresponds somewhat to the dyeing obtained in a single bath with the base and sodium copper tartrate.

The sodium copper pyrophosphate is prepared in the following manner:

44.6 parts of crystalline sodium pyrophosphate are dissolved in 300 parts of hot water, and added to a solution of 51 parts of crystalline copper sulfate (CuSO$_4$.5H$_2$O) in 200 parts of water. There is formed immediately a white precipitate of copper pyrophosphate, which is filtered off and washed with water.

The resulting copper pyrophosphate is introduced into a boiling solution of 134 parts of crystalline sodium pyrophosphate in 150 parts of water, and the mixture is boiled until dissolution is complete. The deep blue clear solution is evaporated in vacuo, the easily water-soluble sodium copper pyrophosphate being precipitated in the form of a pale powder.

In the same manner sodium nickel pyrophosphate can be made from nickel sulfate.

Example 10

1 part of the dyestuff of the formula

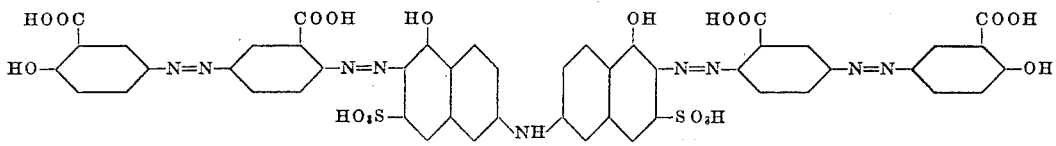

is dissolved in 100 parts of water. 50 parts of this stock solution are added to 2900 parts of a dyebath having a temperature of 60° C. After introducing 50 parts by volume of a solution of 1 part of sodium copper pyrophosphate and 2 parts of 1:2-di-(β-hydroxyethylamino)-ethane in 100 parts of water, 100 parts of previously wetted cotton are entered and dyeing is carried out as described in Example 1. There is obtained a blue dyeing fast to washing and light, which is purer than, and of the same strength as, a dyeing produced by the usual after-coppering process.

Example 11

1 part of the dyestuff of the formula

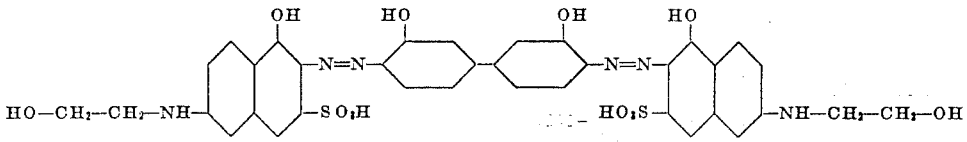

and 1 part of sodium pyrophosphate are dissolved in 1000 parts of water and diluted to 3000 parts by volume. 1 part of copper glycocoll [Cu(NH$_2$—CH$_2$—COO)$_2$] and 2 parts of 1:2-(β-hydroxyethylamino)-ethane are then added. 100 parts of cotton are dyed in the resulting bath for one hour, the temperature being raised in the course of 20 minutes from 60 to 90–95° C., and after ½ hour 30 parts of crystalline sodium sulfate are added. After exhausting the bath the dyeing is rinsed and dried. There is obtained a strong blue tint of very good fastness to washing and light.

Similar results are obtained by using, instead of copper glycocoll, sodium copper tartrate and, instead of 2 parts of 1:2-di-(hydroxyethylamino)-ethane, 2 parts of monoethanolamine.

By the usual methods of after-coppering there is obtained a more reddish duller tint of approximately the same strength.

Example 12

1 part of the dyestuff of the formula

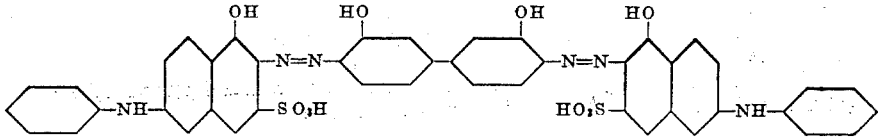

is dissolved with 1 part of sodium hydroxide solution in 400 parts of water. 20 parts of the resulting stock solution are added to a dyebath of 280 parts of water at 60° C. 2 parts of a solution of 5 parts of sodium copper pyrophosphate and 5 parts of 1:2-di-(β-hydroxyethylamino)-ethane in 100 parts of water are then added, and 100 parts of previously wetted cotton are entered.

Dyeing is carried on for a total of one hour, the temperature being raised slowly from about 50–60° C. to 90–95° C. When the bath is practically exhausted, the cotton is rinsed and dried, and there is obtained a greenish blue dyeing which is extraordinarily fast to washing and light.

A dyeing produced with the same stock solution and the same quantity of dyestuff, but by an ordinary after-coppering process, is considerably weaker, even when 30 parts of crystalline sodium sulfate are added to the dyebath.

By using instead of the above dyestuff, 1 part of the dyestuff of the formula

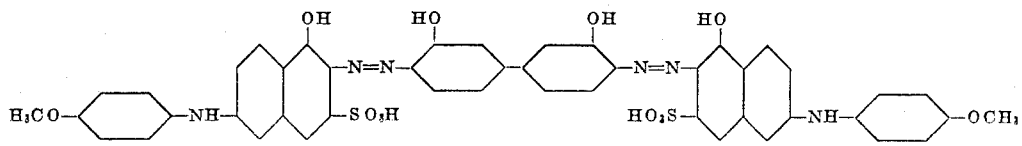

and otherwise proceeding in the manner described above, there is produced a remarkably fast and strong blue dyeing, which is stronger than a corresponding dyeing produced by the usual after-coppering process.

Example 13

4 parts of the dyestuff of the formula

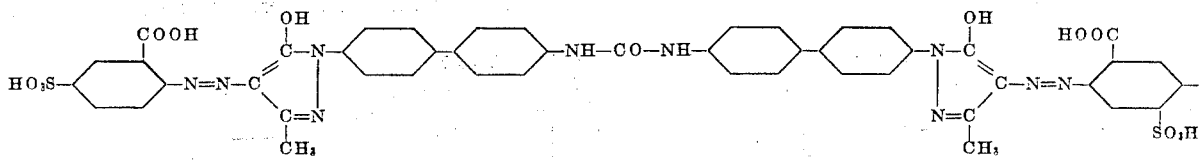

are mixed with 2 parts of sodium copper pyrophosphate and 1 part of glycocoll.

The mixture is introduced into a dyebath of 3000 parts of water at 60° C., and 100 parts of previously wetted cotton are entered at the same temperature, dyeing being carried on for a total of one hour. The temperature is brought to the boil in the course of 20 minutes and after ½ hour 30 parts of crystalline sodium sulfate are added.

When the dyeing is complete, the goods are rinsed cold and dried, and there is obtained a yellow dyeing of very good fastness to washing and light, which is in no way inferior in strength and fastness to a corresponding dyeing produced by the known after-coppering process.

By using instead of glycocoll 2 parts of 1:2-di-(β-hydroxyethylamino)-ethane a similar good result is obtained.

Example 14

1 part of the dyestuff of the formula

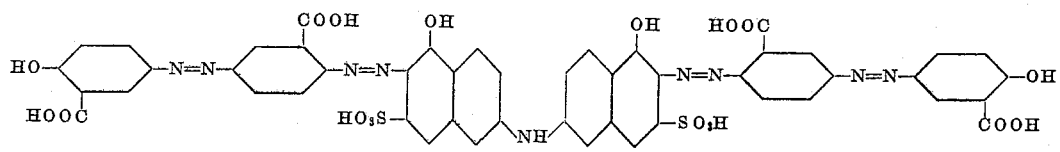

is mixed with 1.5 parts of 1:2-di-(β-hydroxyethylamino)-ethane and 1.4 parts of the copper pyrophosphate complex of the formula

[Cu(HO—CH₂—CH₂—NH—CH₂—
        CH₂—NH—CH₂—CH₂—OH)]₂P₂O₇

1 part of the resulting dyestuff preparation is dissolved at the boil in 200 parts of water. The resulting clear solution is diluted with water to 2000 parts by volume, and 100 parts of previously wetted cotton are entered at 50–60° C. The temperature is raised to the boil in the course of ½ hour while moving the goods. Boiling is continued for an hour, during which two portions of 15 parts of crystalline sodium sulfate are added, one after 5 minutes and the other after 20 minutes, After rinsing and drying the cotton, there is obtained a blue dyeing of good fastness to light and washing.

The above-mentioned copper pyrophosphate complex is prepared as follows:

A solution of 51 parts of crystalline copper sulfate in 200 parts of water added to a hot solution of 44.6 parts of crystalline sodium pyrophosphate in 300 parts of water. There is formed immediately a white precipitate of copper pyrophosphate, and the latter is filtered off and washed with water.

The resulting copper pyrophosphate is suspended in 500 parts of boiling water and 29.6 parts of 1:2-di-(β hydroxyethylamino)-ethane are added, and the whole is boiled until a clear deep blue solution is obtained. The solution is evaporated to dryness in vacuo, whereby a complex is obtained in the form of a dark blue powder.

Instead of the copper pyrophosphate complex described above, there may be used with equal success the same quantity of the complex of the formula

[Cu(H₂N—CH₂—CH₂—OH)₂]₂P₂O₇

It is prepared in a manner analogous to the prescription given in the third to fifth paragraphs of this example, 24.4 parts of 2-aminoethanol being used instead of 29.6 parts of 1:2-di-(β-hydroxyethylamino)-ethane.

Example 15

1 part of the dyestuff of the formula

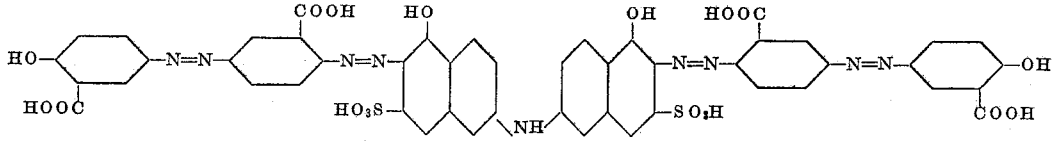

is dissolved in 100 parts of water. 50 parts of the resulting stock solution is added to the dyebath and the temperature is brought to 60° C. After introducing 50 parts of a solution of 2 parts of sodium copper tartrate and 2 parts of 1:2-di-(β-hydroxyethylamino)-ethane and 1 part of crystalline sodium pyrophosphate in 100 parts of water, 100 parts of previously wetted cotton are entered into the dyebath and dyeing is carried on for a total of one hour, the temperature being raised in the course of 20 minutes to 90–95° C., and 30 parts of crystalline sodium sulfate being added after ½ hour.

There is obtained a strong blue dyeing of very good fastness to light and washing.

Example 16

5 parts of the dyestuff of the formula

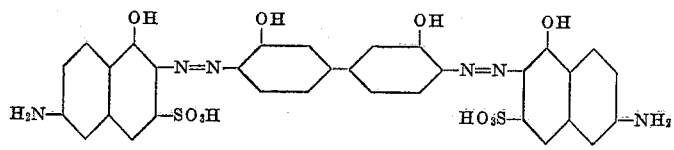

are boiled with 10 parts of sodium copper pyro-phosphate (3Na₄P₂O₇.Cu₂P₂O₇), 10 parts of crystalline sodium pyrophosphate and 150 parts of urea together with 30 parts of 2-aminoethanol in 305 parts of water. The mixture is stirred into 500 parts of neutralized tragacanth thickening (60/1000), and printed on cotton. After printing, the goods are dried and steamed for 10 minutes. After thorough rinsing with cold water, there is obtained a blue print of excellent fastness to light and washing.

Instead of the copper compound, there may be used with equal success the same quantity of the nickel compound of the same dyestuff.

Example 17

5 parts of the copper compound of the dyestuff of the formula

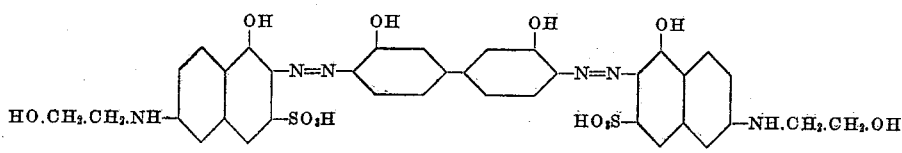

are mixed with 15 parts of crystalline sodium pyrophosphate and 150 parts of urea, and boiled with 30 parts of a mixture consisting mainly of 1:2-di-(β-hydroxyethylamino)-ethane and 2-aminoethanol (prepared as described in Example 3) in 300 parts of water. The mixture is stirred into 500 parts of neutralized tragacanth thickening (60/1000) and printed on cotton. After printing, the goods are dried and steamed for 10 minutes. After thoroughly rinsing in the cold there is obtained a blue print of excellent fastness to light and washing.

By using in this example, instead of the copper compound of the dyestuff, the same quantity of the nickel compound of the same dyestuff there are obtained somewhat more reddish prints having the same properties of fastness.

What we claim is:

1. Process for coloring cellulosic textile materials with metalliferous azo-dyestuffs sparingly soluble in water, which comprises applying to said materials a neutral to alkaline aqueous dyestuff composition which contains a dyestuff containing at least two azo linkages and being capable of forming metal compounds sparingly soluble in water, an aliphatic amine corresponding to the formula

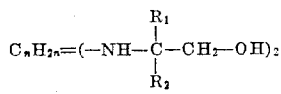

in which $R_1$ represents a member selected from the group consisting of a hydrogen atom, an alkyl group having at most three carbon atoms, and a hydroxymethyl group, $R_2$ represents a member selected from the group consisting of a hydrogen atom and a methyl group, and $n$ represents a whole number of at the most 4, and anions of a phosphoric acid containing at least two phosphorus atoms in the acid molecule, said composition containing in combined form a metal having an atomic number from 27 to 29, said metal being present in alkali-resistant combination.

2. Process for coloring cellulosic textile materials with metalliferous azo-dyestuffs sparingly soluble in water, which comprises applying to said materials a neutral to alkaline aqueous dyestuff composition which contains a dyestuff containing at least two azo linkages and being capable of forming metal compounds sparingly soluble in water, an aliphatic amine corresponding to the formula

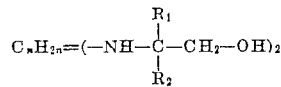

in which $R_1$ represents a member selected from the group consisting of a hydrogen atom, an alkyl group having at most three carbon atoms, and a hydroxymethyl group, $R_2$ represents a member selected from the group consisting of a hydrogen atom and a methyl group, and $n$ represents a whole number of at the most 4, and anions of a phosphoric acid corresponding to the formula

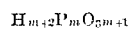

in which $m$ represents a whole number greater than 1, said composition containing in combined form a metal having an atomic number from 27 to 29, said metal being present in alkali-resistant combination.

3. Process for coloring cellulosic textile materials with metalliferous azo-dyestuffs sparingly soluble in water, which comprises applying to said materials a neutral to alkaline aqueous dyestuff composition which contains a dyestuff containing at least two azo linkages and being capable of forming metal compounds sparingly soluble in water, an aliphatic amine corresponding to the formula

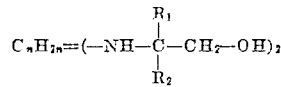

in which $R_1$ represents a member selected from the group consisting of a hydrogen atom, an alkyl group having at most three carbon atoms, and a hydroxymethyl group, $R_2$ represents a member selected from the group consisting of a hydrogen atom and a methyl group, and $n$ represents a whole number of at the most 4, and anions of a phosphoric acid corresponding to the formula

in which $m$ represents a whole number greater than 1, said composition containing in combined form a metal having an atomic number from 28 to 29, said metal being present in alkali-resistant combination.

4. Process for coloring cellulosic textile materials with metalliferous azo dyestuffs sparingly soluble in water, which comprises applying to said materials a neutral to alkaline aqueous dyestuff composition which contains dyestuff containing at least two azo linkages and being capable of forming metal compounds sparingly soluble in water, an aliphatic amine corresponding to the formula

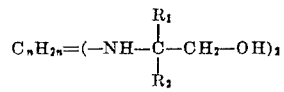

in which $R_1$ represents a member selected from the group consisting of a hydrogen atom, an alkyl group having at most three carbon atoms, and a hydroxymethyl group, $R_2$ represents a member selected from the group consisting of a hydrogen atom and a methyl group, and $n$ represents a whole number of at the most 4, and anions of pyrophosphoric acid, said composition containing in combined form a metal having an atomic number from 28 to 29, said metal being present in alkali-resistant combination.

5. Process for coloring cellulosic textile materials with metalliferous azo-dyestuffs sparingly soluble in water, which comprises applying to said materials a neutral to alkaline aqueous dyestuff composition which contains a dyestuff containing at least two azo linkages and being capable of forming metal compounds sparingly soluble in water, an aliphatic amine corresponding to the formula

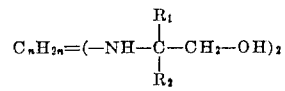

in which $R_1$ represents a member selected from the group consisting of a hydrogen atom, an alkyl group having at most three carbon atoms and a hydroxymethyl group, $R_2$ represents a member selected from the group consisting of a hydrogen atom and a methyl group and $n$ represents a whole number of at the most 4, and anions of pyrophosphoric acid, said composition containing copper in combined form, said copper being present in alkali-resistant combination.

6. Process for coloring cellulosic textile materials with metalliferous azo-dyestuffs sparingly soluble in water, which comprises applying to said materials a neutral to alkaline aqueous dyestuff composition which contains a dyestuff containing at least two azo linkages and being capable of forming metal compounds sparingly soluble in water, an aliphatic amine corresponding to the formula

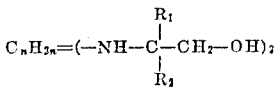

in which $R_1$ represents a member selected from the group consisting of a hydrogen atom, an alkyl group having at most three carbon atoms and a hydroxymethyl group, $R_2$ represents a member selected from the group consisting of a hydrogen atom and a methyl group and $n$ represents a whole number of at the most 4, and anions of pyrophosphoric acid, said composition containing nickel in combined form, said nickel being present in alkali-resistant combination.

7. Process for coloring cellulosic textile materials with metalliferous azo dyestuffs sparingly soluble in water, which comprises applying to said materials a neutral to alkaline aqueous dyestuff composition which contains a dyestuff containing at least two azo linkages and being capable of forming metal compounds sparingly soluble in water, 1:2-di-(β-hydroxyethylamino)-ethane, and anions of pyrophosphoric acid, said composition containing copper in combined form, said copper being present in alkali-resistant combination.

8. Process for coloring cellulosic textile materials with metalliferous azo dyestuffs sparingly soluble in water, which comprises applying to said materials a neutral to alkaline aqueous dyestuff composition which contains a dyestuff containing at least two azo linkages and being capable of forming metal compounds sparingly soluble in water, 1:2-di-(β-hydroxyethylamino)-ethane and anions of pyrophosphoric acid, said composition containing of nickel in combined form, said nickel being present in alkali-resistant combination.

9. Process for coloring cellulosic textile materials with metalliferous azo dyestuffs sparingly soluble in water, which comprises applying to said materials a neutral to alkaline aqueous dyestuff composition which contains a dyestuff of the formula

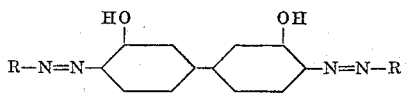

wherein each R represents the radical of a 2-amino-5-hydroxynaphthalene-7-sulfonic acid bound in 6-position to the azo linkage, 1:2-di(β-hydroxyethylamino)-ethane, and anions of pyrophosphoric acid, said composition containing copper in combined form, said copper being present in alkali-resistant combination.

10. Process for coloring cellulosic textile materials with metalliferous azo dyestuffs sparingly soluble in water, which comprises applying to said materials a neutral to alkaline aqueous dyestuff composition which contains a dyestuff of the formula

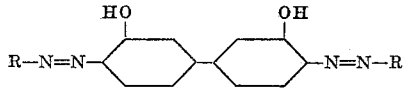

wherein each R represents the radical of a 2-amino-5-hydroxynaphthalene-7-sulfonic acid bound in 6-position to the azo linkage, 1:2-di-(β-hydroxyethylamino)-ethane, and anions of pyrophosphoric acid, said composition containing nickel in combined form, said nickel being present in alkali-resistant combination.

11. Process for coloring cellulosic textile materials with metalliferous azo dyestuffs sparingly soluble in water, which comprises applying to said materials a neutral to alkaline aqueous dyestuff composition which contains the complex copper compound of a dyestuff of the formula

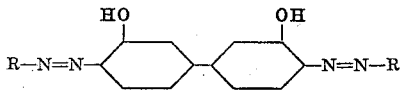

wherein each R represents the racial of a 2-amino-5-hydroxynaphthalene-7-sulfonic acid bound in 6-position to the azo linkage, 1:2-di-(β-hydroxyethylamino)-ethane, and an alkali pyrophosphate.

12. Process for coloring cellulosic textile materials with metalliferous azo dyestuffs sparingly soluble in water, which comprises applying to said materials a neutral to alkaline aqueous dyestuff composition which contains the complex nickel compound of a dyestuff of the formula

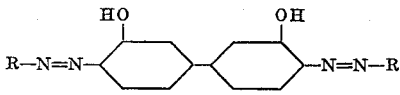

wherein each R represents the radical of a 2-amino-5-hydroxynaphthalene-7-sulfonic acid bound in 6-position to the azo linkage, 1:2-di-(β-hydroxyethylamino)-ethane, and an alkali pyrophosphate.

13. Process for coloring cellulosic textile materials with metalliferous azo dyestuffs sparingly soluble in water, which comprises applying to said materials a neutral to alkaline aqueous dyestuff composition which contains the complex copper compound of the dyestuff of the formula

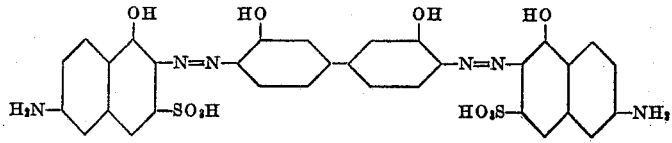

1:2-di-(β-hydroxyethylamino)-ethane, and sodium pyrophosphate.

14. Process for coloring cellulosic textile materials with metalliferous azo dyestuffs sparingly soluble in water, which comprises applying to said materials a neutral to alkaline aqueous dyestuff composition which contains the complex nickel compound of the dyestuff of the formula

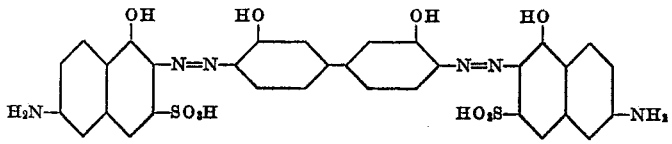

1:2-di-(β-hydroxyethylamino)-ethane, and sodium pyrophosphate.

15. Process for coloring cellulosic textile materials with metalliferous azo dyestuffs sparingly soluble in water, which comprises applying to said materials a neutral to alkaline aqueous dyestuff composition which contains the complex copper compound of the dyestuff of the formula

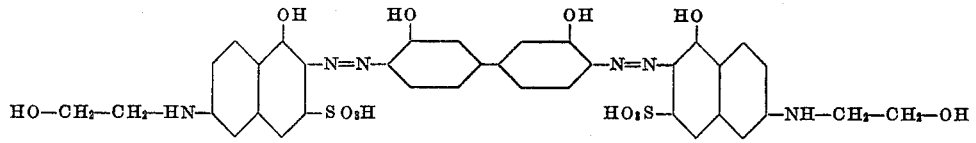

1:2-di-(β-hydroxyethylamino)-ethane, and sodium pyrophosphate.

16. Process for coloring cellulosic textile materials with metalliferous azo dyestuffs sparingly soluble in water, which comprises applying to said materials a neutral to alkaline aqueous dyestuff composition which contains the complex nickel compound of the dyestuff of the formula

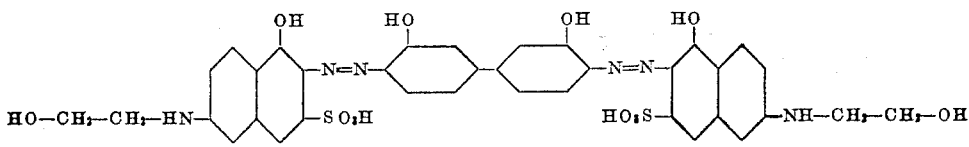

1:2-di-(β-hydroxyethylamino)-ethane, and sodium pyrophosphate.

17. A neutral to alkaline aqueous azo-dyestuff composition suitable for being applied on cellulosic textile materials, which contains a dyestuff containing at least two azo linkages and being capable of forming metal compounds sparingly soluble in water, an aliphatic amine corresponding to the formula

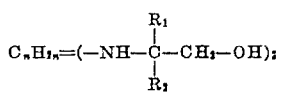

in which $R_1$ represents a member selected from the group consisting of a hydrogen atom, an alkyl group having at most three carbon atoms, and a hydroxymethyl group, $R_2$ represents a member selected from the group consisting of a hydrogen atom and a methyl group, and $n$ represents a whole number of at the most 4, and anions of a phosphoric acid containing at least two phosphorus atoms in the acid molecule, said composition containing in combined form a metal having an atomic number from 27 to 29, said metal being present in alkali-resistant combination.

18. A dyestuff preparation suitable for being applied on cellulosic textile materials, which contains a dyestuff containing at least two azo linkages and being capable of forming metal compound sparingly soluble in water, an aliphatic amine corresponding to the formula

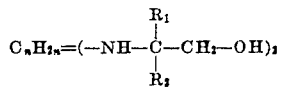

in which $R_1$ represents a member selected from the group consisting of a hydrogen atom, an alkyl group having at most three carbon atoms, and a hydroxymethyl group, $R_2$ represents a member selected from the group consisting of a hydrogen atom and a methyl group, and $n$ represents a whole number of at the most 4 anions of a phosphoric acid containing at least two phosphorus atoms in the acid molecule, said composition containing in combined form a metal having an atomic number from 27 to 29, said metal being present in alkali-resistant combination.

References Cited in the file of this patent

UNITED STATES PATENTS

| | | |
|---|---|---|
| 2,071,385 | Bell | Feb. 23, 1937 |
| 2,594,803 | Riat | Apr. 28, 1952 |
| 2,662,906 | Menzi | Dec. 15, 1953 |

FOREIGN PATENTS

| | | |
|---|---|---|
| 676,584 | Great Britain | July 30, 1952 |
| 169,324 | Austria | Nov. 10, 1951 |

OTHER REFERENCES

Jour. Soc. Dyers and Colorists for November 1946, pages XVI (advertisement).